Patented Aug. 29, 1933

1,924,446

UNITED STATES PATENT OFFICE 1,924,446

HALOGENATED ANTHRAQUINONE ACRIDONE AND THE PROCESS OF PREPARING IT

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application November 10, 1930, Serial No. 494,802, and in Germany November 18, 1929

5 Claims. (Cl. 260—37)

The present invention relates to an improved process of producing vat dyestuffs of the acridone series.

We have found that very valuable vat dyestuffs of the acridone series containing halogen are obtained by treating with halogen or agents supplying halogen, imino-ortho-carboxylic acid compounds of the general formula:

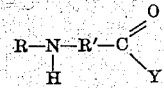

in which R and R' stand for aromatic, iso- or heterocyclic radicles which may be substituted and of which at least one is vattable, and R is unsubstituted in an ortho-position to the imino group, and Y for an alcohol or phenol radicle or an amino or substituted amino group. Preferably the esters of the said kind are employed in the halogenation process. The imino-ortho-carboxylic acid compounds employed as the initial materials may be prepared for example as follows:—by condensation of aromatic carboxylic acid derivatives which are negatively substituted in the ortho-position to the substituted carboxylic acid group with aromatic amines having at least one ortho position to the amino group free, or by condensation of aromatic ortho-aminocarboxylic acid derivatives with negatively substituted aromatic compounds having at least one ortho-position to the negative substituents free, whereby in all cases at least one of the reaction components must be capable of vatting. Condensation products of this type are described for example in the application Ser. No. 445,519, filed April 18, 1930. Components which may be used for preparing the initial material, comprise, for example, derivatives of the before described kind of the following aromatic compounds and substitution products and homologues thereof: benzene, naphthalene, quinoline, perylene, pyrazolanthrone, benzanthrone, anthraquinone, anthanthrone, dibenzopyrenequinone, pyranthrone, dibenzanthrone, benzanthronepyrazolanthrone, anthraquinonequinoline, dipyrazolanthronyl, pyrimidine, pyrimidone, anthraquinoneazine and flavanthrone.

The halogenation may be carried out by means of the halogens chlorine and bromine proper and by agents supplying these halogens, such as for example phosphorus halides or sulphur halides. The halogenation is carried out either in the absence of any diluent or in an inert organic diluting medium, preferably in an inert aromatic diluting medium of high boiling point, such as nitrobenzene, halogenbenzenes, naphthalene and the like. An addition of one or several of the known halogenation catalysts, for example metals and metal compounds, for example iron, manganese, mercury, antimony and their halides, or non-metals, such as sulphur, phosphorus, iodine and selenium, is often advantageous. Acid-binding agents, as for example alkali metal or alkaline earth metal salts of weak acids or alkaline earth metal oxides, may also be employed in the reaction.

The products obtained according to the present invention are acridone derivatives containing chlorine or bromine or chlorine and bromine and are usually obtained in good yields and in a state of good purity. They dye the vegetable fibre a great variety of shades and are also valuable intermediate products for the preparation of dyestuffs. The shades obtained with the dyestuffs and the properties thereof can often be varied or improved by treating the acridone derivatives obtained with agents which split off halogen or hydrogen halide. Such splitting off is often already effected when vatting the products at temperatures above about 60° C., or may be brought about in organic solvents by means of agents having a reducing action in the presence of such metals any oxides of which are readily reduced to metals, as described in the copending application Ser. No. 466,577, filed July 8, 1930. Agents having a reducing action comprise, for example hydrazine and its derivatives, hydroquinone, dioxindole, hydrazobenzene, glyoxal, guanidine and the like. Metals of the said kind are, for example, copper, nickel, iron, cobalt, silver and their oxides or salts thereof.

If necessary the products may be purified by the usual methods, as for example by crystallization or by extraction with organic solvents, by treatment with oxidizing agents, as for example with sodium hypochlorite, or by way of their oxonium salts, as for example by way of their oxonium sulphates.

The following examples will further illustrate the nature of this invention, but the invention is not restricted to these examples. The parts are by weight.

*Example 1*

2 parts of the condensation product from dibromo-3.4.8.9-dibenzopyrene-5.10-quinone (obtainable by brominating the said dibenzopyrenequinone in chlorosulphonic acid in the presence of antimony) and 1-aminoanthraquinone-2-carboxylic acid ethyl ester are suspended in 20 parts of trichlorbenzene and heated to from 180° to 190° C. while stirring. Dry chlorine gas is then led in until the reaction liquid has become pure brown red in colour, which is the case after a few hours. The whole is allowed to cool and the reaction product is isolated by filtering by suction or by distilling off the solvent, if desired under reduced pressure and/or with steam. The reaction product is a brown red powder which dissolves in concentrated sulphuric acid giving a blue red colouration and gives wine-red very fast dyeings on the vegetable fibre from a blue red vat.

*Example 2*

2 parts of the initial material employed in Example 1 are heated in 20 parts of nitrobenzene, after the addition of 2 parts of bromine, to from 170° to 180° C. while stirring until the reaction liquid has become pure red brown in colour. The reaction mixture is then worked up as described in Example 1. The resulting reaction product containing bromine is a brown powder, dissolves in concentrated sulphuric acid giving a blue red colouration and yields very fast red brown dyeings on cotton from a brown violet vat.

*Example 3*

1 part of the product obtainable by condensing 8-chlorbenzanthrone with 1-aminoanthraquinone-2-carboxylic acid phenyl ester corresponding to the formula:

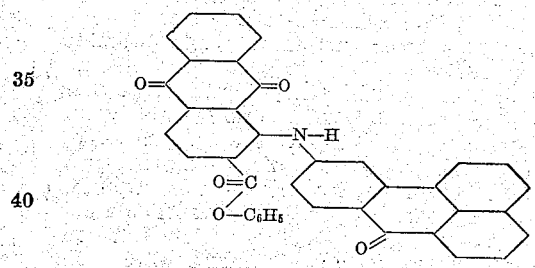

is heated to 160° C. in 10 parts of trichlorbenzene while stirring. Dry chlorine gas is then led in and the whole is heated slowly to boiling. As soon as the reaction mixture has become yellow brown it is allowed to cool and is worked up as described in Example 1. The reaction product containing chlorine obtained in a very good yield corresponds to the formula:

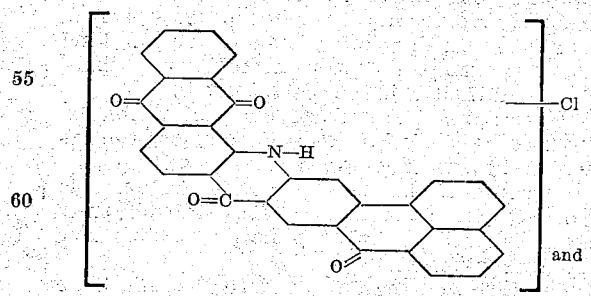

and is an orange crystalline powder which dissolves in concentrated sulphuric acid giving a blue red coloration and yields very fast yellow brown dyeings on cotton from a brown vat.

Instead of chlorine, phosphorus pentachloride may be employed as the chlorinating condensing agent, if desired in the absence of trichlorbenzene.

Reaction products giving similar dyeings are likewise obtained from other benzanthrone-anthraquinonylamino-ortho-carboxylic acid esters by treating with halogen.

*Example 4*

30 parts of bromine are added, while stirring, at 100° C. to 10 parts of 2′.5′-dichloro-1-anilido-anthraquinone-2-carboxylic acid benzyl ester corresponding to the formula:

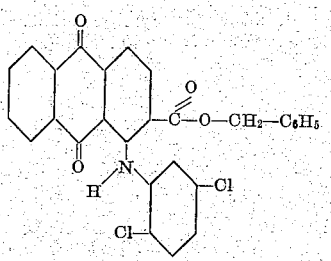

in 100 parts of nitrobenzene after the addition of 1 part of iodine. The whole is then heated to 180° C., kept at the same temperature for several hours, allowed to cool and the dibromo-Bz2.Bz5-dichloranthraquinone-2.1-benzacridone corresponding to the formula:

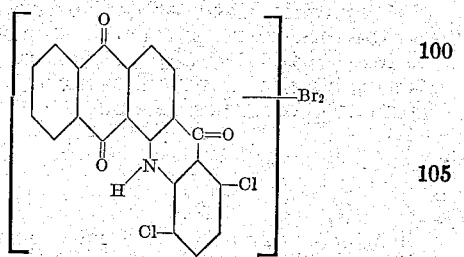

precipitated in the form of red violet needles having a metallic lustre is filtered off by suction. It dissolves in concentrated sulphuric acid giving an orange colouration, yields a violet blue vat and dyes the vegetable fibre rose-red shades having very good fastness.

A chloro-acridone giving rose dyeings is obtained in an analogous manner with chlorine in trichlorbenzene. Similarly a brominated naphthacridone is obtained from 1-beta-naphthylaminoanthraquinone-2-carboxylic acid benzyl ester with bromine in nitrobenzene.

*Example 5*

20 parts of the product obtainable by condensing 1-chloroanthraquinone-2-carboxylic acid amide with 3.4.5-trichloroaniline are heated at between 180° and 200° C. in a shaking autoclave with 50 parts of bromine for 10 to 12 hours. After cooling, the reaction mixture is poured into water, the excess of bromine removed by means of sodium bisulphite and the bromotrichloroanthraquinone-2.1(N)-benzacridone filtered off. It is a blue red powder which dissolves in concentrated sulphuric acid to give an orange solution, and dyes cotton from a violet vat pink shades.

What we claim is:—

1. A process of producing halogenated acridones, which comprises causing a halogenating agent selected from the group consisting of chlorine, bromine and agents supplying these halogens, to react on an imino-ortho-carboxylic acid compound of the general formula:

in which R stands for an aromatic radicle which may be substituted by halogen, but is unsubstituted in an ortho position to the imino group, R′ stands for the anthraquinone nucleus, and Y stands for a substituent selected from the group consisting of alkoxy and phenoxy radicles and the amino group.

2. A process for producing halogenated acridones, which comprises causing a halogenating agent selected from the group consisting of chlorine, bromine and agents supplying these halogens, to react in an inert organic diluting medium on an imino-ortho-carboxylic acid compound of the general formula:

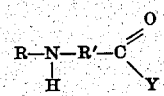

in which R stands for an aromatic radicle which may be substituted by halogen, but is unsubstituted in an ortho position to the imino group, R' stands for the anthraquinone nucleus, and Y stands for a substituent selected from the group consisting of alkoxy and phenoxy radicles and the amino group.

3. A process of producing halogenated acridones, which comprises causing a halogenating agent selected from the group consisting of chlorine, bromine and agents supplying these halogens, to react in an inert aromatic diluting medium in the presence of a halogenation catalyst on an imino-ortho-carboxylic acid compound of the general formula:

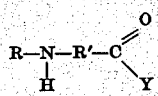

in which R stands for an aromatic radicle which may be substituted by halogen, but is unsubstituted in an ortho position to the imino group, R' stands for the anthraquinone nucleus, and Y stands for a substituent selected from the group consisting of alkoxy and phenoxy radicles and the amino group.

4. A process for producing halogenated acridones, which comprises causing a halogenating agent selected from the group consisting of chlorine, bromine and agents supplying these halogens, to react in an inert aromatic diluting medium on an imino-ortho-carboxylic acid compound of the general formula:

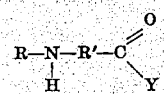

in which R stands for an aromatic radicle which may be substituted by halogen, but is unsubstituted in an ortho position to the imino group, R' stands for the anthraquinone nucleus, and Y stands for an alkoxy or phenoxy group.

5. As a new article of manufacture dibromo-Bz 2.5-dichloroanthraquinone - 2.1(N) - benzacridone forming red violet needles having a metallic lustre, dissolving in concentrated sulphuric acid to give an orange solution and dyeing cotton from a violet blue vat rose red shades.

MAX ALBERT KUNZ.
KARL KOEBERLE.
ERICH BERTHOLD.